(12) United States Patent
Wilson (10) Patent No.: US 6,881,350 B2
(45) Date of Patent: Apr. 19, 2005

(54) APPARATUS AND METHODS FOR COLLECTING AND TRANSFERRING SOLIDS SEPARATED FROM WASTEWATER

(76) Inventor: George E. Wilson, 2363 NE. Stephanie Ct., Hillsboro, OR (US) 97124

( * ) Notice: Subject to any disclaimer, the term of this patent is extended or adjusted under 35 U.S.C. 154(b) by 0 days.

(21) Appl. No.: 10/470,791

(22) PCT Filed: Mar. 8, 2002

(86) PCT No.: PCT/US02/07036

§ 371 (c)(1),
(2), (4) Date: Jul. 29, 2003

(87) PCT Pub. No.: WO02/076567

PCT Pub. Date: Oct. 3, 2002

(65) Prior Publication Data

US 2004/0104183 A1 Jun. 3, 2004

Related U.S. Application Data

(60) Provisional application No. 60/278,078, filed on Mar. 22, 2001.

(51) Int. Cl.$^7$ .......................... B01D 21/24; B01D 21/26
(52) U.S. Cl. .................. 210/788; 210/803; 210/512.1; 210/521; 210/523; 210/532.1
(58) Field of Search ................ 210/787, 788, 210/800, 801, 803, 512.1, 513, 521, 523, 532.1

(56) References Cited

U.S. PATENT DOCUMENTS

| | | | | |
|---|---|---|---|---|
| 2,468,838 A | * | 5/1949 | Augustin ................... 210/189 |
| 2,795,403 A | * | 6/1957 | Mead ........................ 366/107 |
| 3,201,093 A | * | 8/1965 | Smith ........................ 366/28 |
| 3,256,181 A | * | 6/1966 | Zingg et al. ................ 366/142 |
| 3,298,669 A | * | 1/1967 | Zingg ........................ 366/107 |
| 3,741,533 A | * | 6/1973 | Winn, Jr. .................... 366/136 |
| 3,976,109 A | * | 8/1976 | Bailey ........................ 141/9 |
| 3,994,480 A | * | 11/1976 | Fothergill et al. ........ 366/165.2 |
| 4,184,771 A | * | 1/1980 | Day .............................. 366/3 |
| 4,345,841 A | * | 8/1982 | Day .............................. 366/2 |
| 4,399,034 A | * | 8/1983 | Moller ........................ 210/268 |
| 4,898,672 A | | 2/1990 | Clifft et al. |
| 5,160,610 A | | 11/1992 | O'Reilly et al. |
| 5,700,112 A | * | 12/1997 | Lamm et al. ................. 406/93 |
| 5,765,945 A | * | 6/1998 | Palmer ...................... 366/167.1 |
| 6,074,549 A | | 6/2000 | Bacon-Cochrane et al. |
| 6,171,498 B1 | | 1/2001 | Fassbender et al. |
| 2004/0104183 A1 | * | 6/2004 | Wilson ....................... 210/801 |

* cited by examiner

Primary Examiner—Robert James Popovics
(74) Attorney, Agent, or Firm—Klarquist Sparkman, LLP

(57) ABSTRACT

A method of collecting and transferring settling solids that are being settled from raw surface water or wastewater includes collecting settling solids and applying first and second upward flows to the settling solids. The solids are collected in a chamber having a bottom surface and a surrounding side surface. The first upward flow is applied to the solids from a point adjacent the bottom surface. The second upward flow is a suction flow applied at a point above the first upward flow. The first and second flows urge the settling grit upward and out of the chamber through a passageway.

19 Claims, 8 Drawing Sheets

APPARATUS AND METHODS FOR COLLECTING AND TRANSFERRING SOLIDS SEPARATED FROM WASTEWATER

CROSS REFERENCE TO RELATED APPLICATIONS

This application is a U.S. National Stage of International Application No. PCT/US/07036, filed Mar. 8, 2002, which was published in English under PCT Article 21(2), which in turn claims the benefit of U.S. Provisional Application Ser. No. 60/278,078, filed Mar. 22, 2001. Both applications are incorporated by reference herein in their entirety.

BACKGROUND

The present invention relates to apparatus and methods for collecting and transferring solids, including grit, that have been separated out of raw water or wastewater influent in a generally quiescent settling process.

As used herein, "grit" refers to high-density, inorganic, settleable particles, found in an influent stream (i.e., after the raw water or the raw sewage has been screened but typically before subsequent processing). Grit causes wear to downstream mechanical treatment equipment and, if it accumulates, loss of performance.

One type of apparatus used for separating grit from influent is referred to as a head cell. The hydraulic separation action in a head cell occurs through controlling the influent to flow at predetermined speeds and along a predetermined course, and does not require the use of chemicals. The influent enters at the periphery or rim of a funnel-like conical surface from a direction tangential to the rim, and then flows over and around the downwardly sloping conical surface, at least partially circling a centrally located opening. The flow conditions are determined such that a dynamic boundary layer is developed at the conical surface.

As the influent flows around the downwardly sloping conical surface, the grit is separated out onto the conical surface. At the same time, the remaining liquid, i.e., the effluent (which is relatively grit-free), is guided to flow out of the head cell through openings located at the outer periphery of the conical surface. In general, this effluent is channeled for further treatment downstream.

The separated grit moves downwardly along the sloping conical surface and through the central opening for collection at a point beneath the opening.

A head cell may have several individual conical surfaces or "trays" that are vertically aligned with each other such that grit draining through the central opening in an upper tray also passes through similar central openings in all lower trays. The separated grit is collected at a point beneath the lowest tray.

Figure 5:
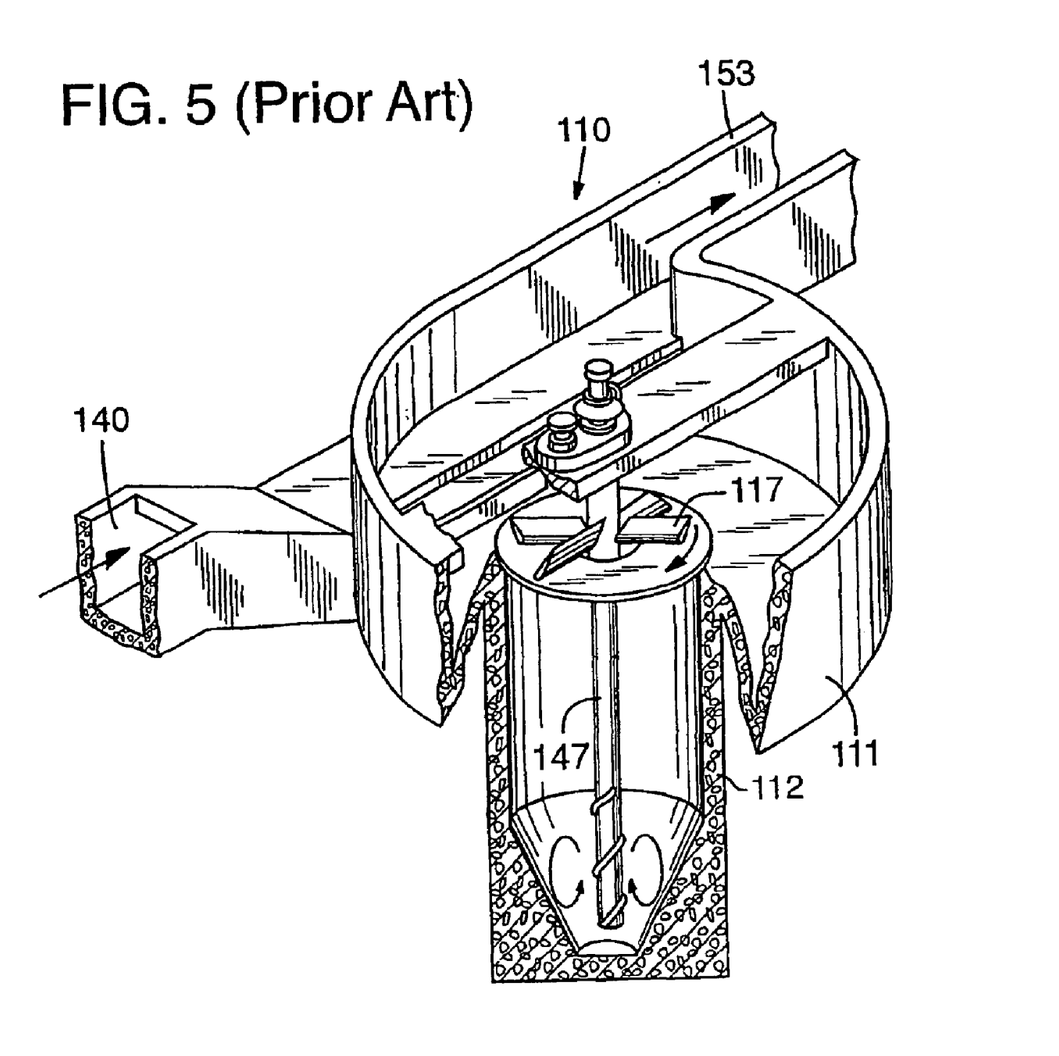
FIG. 5 is perspective view, partially in section, of a conventional vortex grit removal system in which grit is collected in a chamber beneath the separating section.

According to another conventional approach, a vortex separator is used both to (1) separate the grit from the influent (as an alternative to the head cell described above) and (2) collect and transfer the grit. In a conventional vortex separator 110, as shown in FIG. 5, influent is channeled through an inlet trough 140 into and around a settling chamber 111, grit is separated from the influent in the settling chamber 111 under the action of boundary layer flow established by a rotating blade 117, and the resulting effluent is channeled out of the separator 110 through an outlet trough 153.

The influent travels downwardly, and then spirals upwardly over the course of approximately 450 degrees before exiting the settling chamber 111. The boundary layer flow causes the grit to travel from the periphery of the settling chamber 111, where separation begins, towards the center of the chamber 111, and downwardly through a central opening 115 in the settling chamber 111, to a grit storage chamber 112 positioned below the chamber 111.

After grit begins accumulating in the grit storage chamber 112, it must be transferred out of the separator 110. In the conventional separator 110, a pump (not shown) lifts the grit particles up from the bottom of the chamber 112 and propels them upward through a pipe 147 and out of the separator 110. A similar conventional approach could be used to transfer accumulated grit from a grit storage chamber 60 of the conventional head cell 10 as shown in FIG. 2D.

This conventional approach, however, is subject to failure. For example, if too much grit accumulates in the grit storage chamber, e.g., in the case of a heavy concentration of grit or a power failure that prevents operation of the pump, the pipe 147 may become clogged. Occasionally, objects in the influent other than grit (e.g., rags) also may foul the pipe 147.

In these situations, the separating apparatus must be shut down and partially dismantled to allow access to the grit storage chamber and pump for manual defouling. The apparatus cannot be defouled simply by restoring operation to the pump or operating it in a different mode. Manual defouling is costly and very inconvenient. Some installations even provide for backup vortex separators in anticipation of such fouling problems, which represents an additional cost in providing redundant equipment.

Therefore, it would be desirable to provide an apparatus for collecting and transferring grit out of the grit storage chamber that is efficient, highly reliable and not subject to regular fouling. It would also be desirable to provide an apparatus that is self-clearing.

SUMMARY

New methods and associated apparatus are provided for collecting and transferring grit that is being separated from raw water or wastewater as one step in a treatment process.

According to the new methods and apparatus, grit that settles in an area below a separation apparatus, e.g., in a chamber, well or other structure having bottom and side walls, is transferred out of this area for disposal or other use. The collected grit is transferred by applying an upwardly directed first flow from a point below the grit (generated by a first force or pressure) and applying an upwardly directed second flow to the grit at a point spaced above the first flow (generated by a second force or pressure). The first and second flows act on the grit in substantially the same direction.

The first and second flows may be applied to act in a substantially vertical direction, and to act along a common axis (which may be the central axis of the separation apparatus).

The first and second flows may be applied to accumulating grit within the chamber hydraulically, i.e., through fluid flows. In one implementation, the first flow is applied to the grit by a pressurized flow of fluid that is ejected from a nozzle at the end of a passageway against the bottom surface of the accumulated grit.

The second flow, which is applied at a level above the first flow, is generated by a suction flow through a passageway having an inlet end within the chamber and an outlet side leading to a source of negative pressure for generating the suction flow.

An optional third flow can be applied to the settling grit and wastewater to cause circulation within the collection and transfer area. According to one approach, a third flow is applied in a direction angled with respect to the line of action of the first and second flows. The third flow is applied at a point spaced from this line of action and thus generates circulation about the line of action. Greater circulation occurs if the third flow is applied in a direction substantially perpendicular to the line of action.

The third flow can also be applied hydraulically. In the case of a cylindrical chamber, the third flow can be applied by a pressurized fluid flow that enters the chamber from a tangential direction. The circulation of fluid and grit in the chamber at a desired rate tends to prevent the grit from settling and causes it to move inwardly toward the center of the chamber, where it is more directly subject to the first and second flows.

Recitation of any aspect in this Summary of the Disclosure is not intended to imply that the aspect is an essential element. The Summary is instead provided to facilitate understanding of the following detailed description.

DETAILED DESCRIPTION

As described below, new methods and apparatus provide for improved performance and efficiency in collecting grit that has been separated from raw water or wastewater with a separation apparatus, and transferring it away (e.g., for subsequent disposal or other use). In specific implementations, the separation apparatus is a head cell that removes grit from influent at an initial stage before the resulting effluent from the head cell is subjected to subsequent treatment. The new methods and apparatus, however, can also be used with other types of grit removal apparatus, including, e.g., the conventional vortex separator described above and shown in FIG. 5.

Grit and Grit Separation

Separating grit from influent before subsequent treatment can help alleviate two problems: (1) wear (especially of rotating parts), and (2) accumulation of grit that leads to loss of performance. As used herein, "grit" refers to inorganic, settleable solids that are denser than water (i.e., having a specific gravity greater than 1.0). Grit includes both particles that travel along the bottoms of pipes, channels, ducts, etc., and particles that are suspended within the influent.

Inorganic particles tend to be abrasive, thus contributing to the wear problem unless removed. Settleable refers to those particles that can be caused to settle for collection and removal under conditions existing in a typical surface water or wastewater treatment plant.

Such settleable particles have a settling velocity that is approximately equal to or greater than the settling velocity of a 50 micron particle of silica sand (sometimes expressed as "50 micron SES" (Sand Equivalent Size)). The settling velocity for a 50 micron SES particle in a quiescent tank is about 0.22 cm/sec. The settling velocity is a single parameter that allows particles having different specific gravities and sizes to be compared.

Conventional Head Cell Construction

Figure 1A:
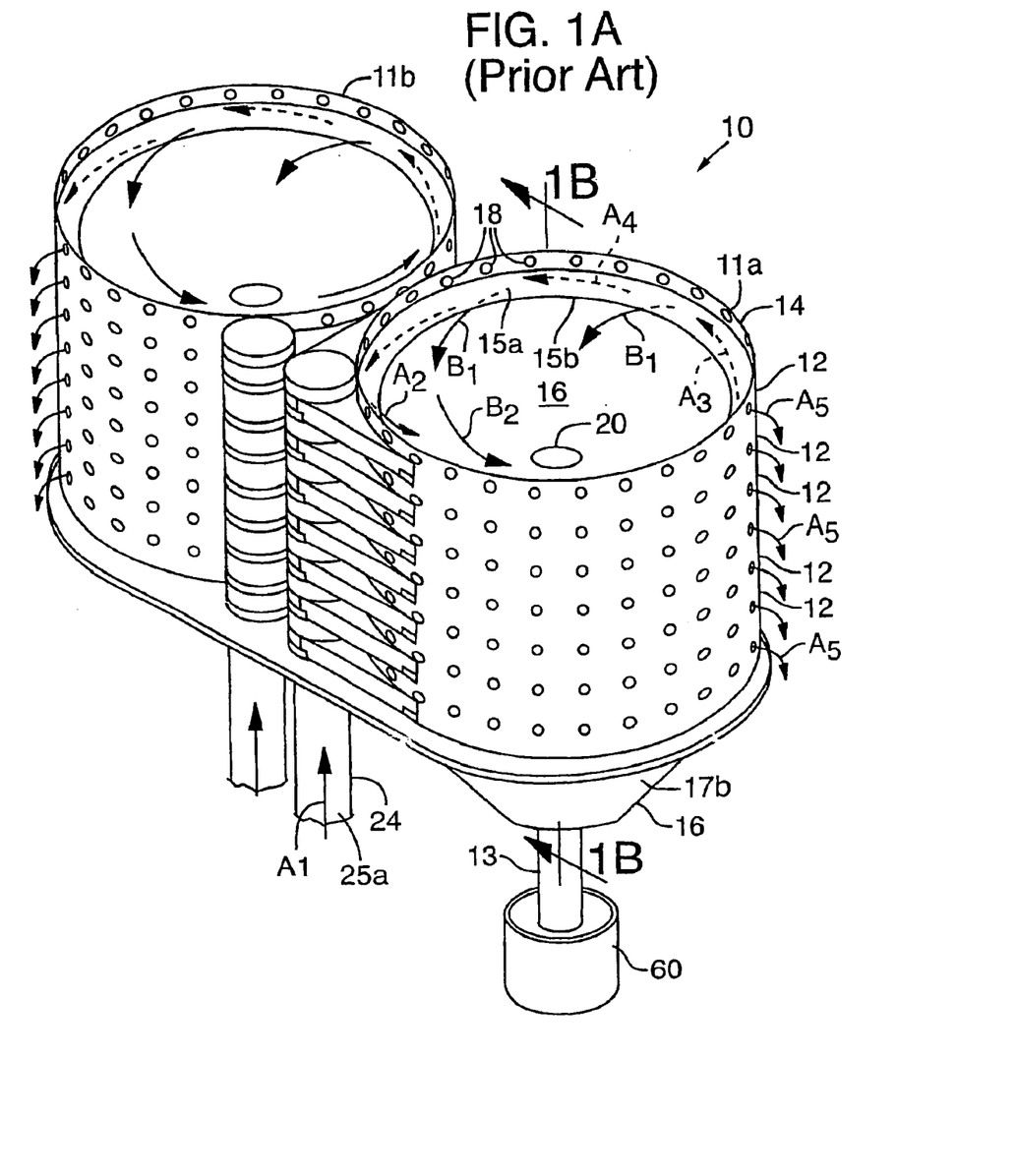
FIG. 1A is a perspective view of a conventional head cell installation having two head cell apparatus that each have a vertical influent pipe through which influent is directed upwardly into multiple trays, showing the paths of the influent, the separated grit that accumulates in the grit accumulation chamber, and the resulting effluent.

A conventional head cell installation 10 is shown in FIG. 1A. The conventional head cell installation 10 operates with an upward feed, and thus has a greater energy requirement than a headcell with a downward feed. (A unique downward-feed headcell is disclosed in commonly-owned U.S. patent application Ser. No. 09/712,693.)

The illustrated installation 10 has two head cell apparatus (or "head cells") 11a, 11b that operate independently of each other, but are placed adjacent each other as shown. The left side head cell 11b has the same general construction and operation as the right side head cell 11a, which is described in detail below.

Figure 1B:
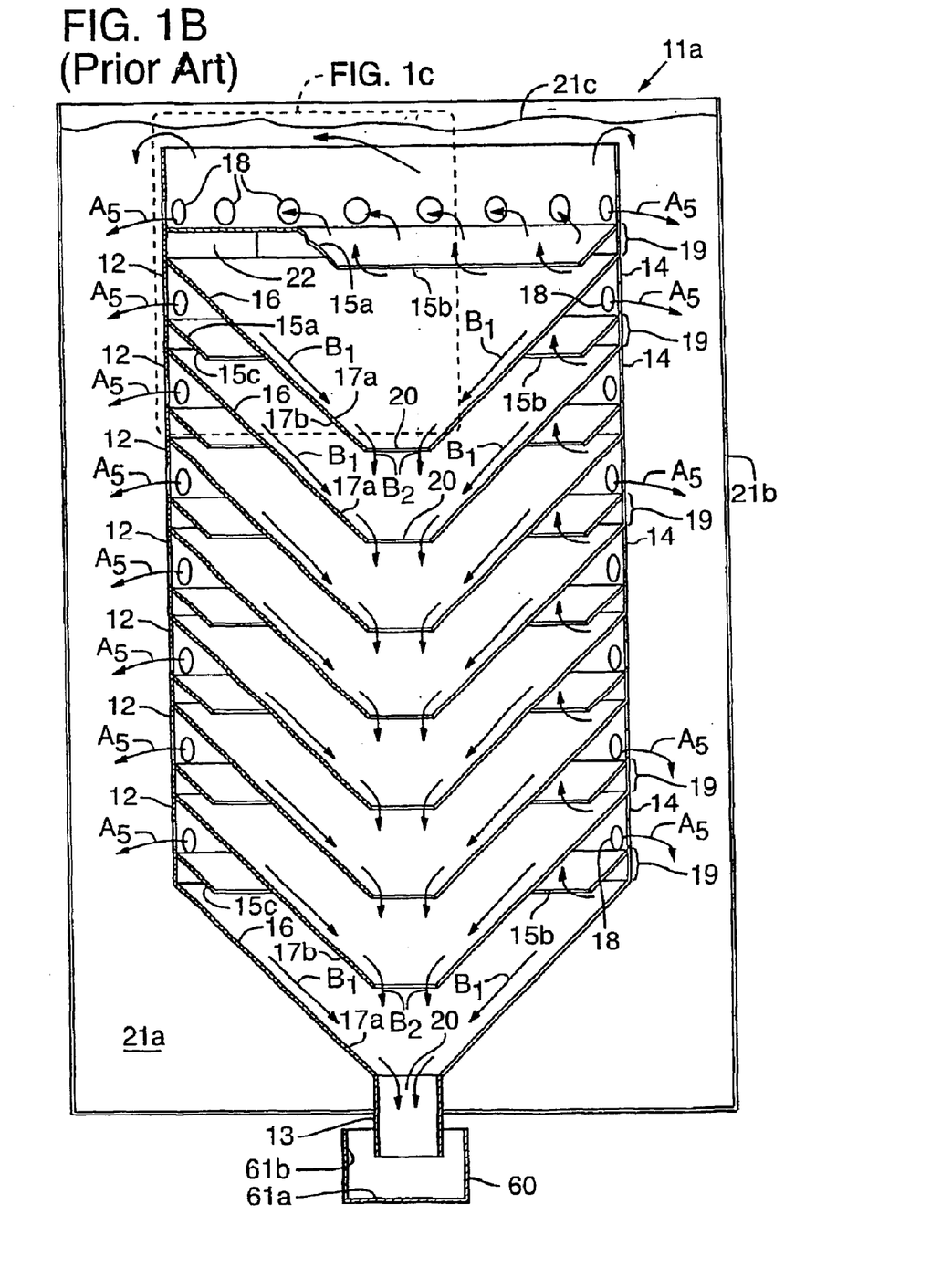
FIG. 1B is a side sectional view of the right side head cell apparatus taken along the line 1B—1B in FIG. 1A, showing the paths of the influent, separated grit and effluent through the multiple trays, with the head cell apparatus shown submerged in a surrounding vessel.

Referring to FIGS. 1A and 1B, the head cell 11a has a number of trays 12 (eight in this example) that are nested together. Depending upon the particular application, a greater or lesser number of trays can be used. Each of the trays 12 has a circular rim 14 joined to a downwardly directed conical section 16 having a central grit exit opening 20. The conical section 16 has an inner sloping surface 17a and an outer sloping surface 17b (visible for the bottom tray 12). The inner sloping surface 17a of each tray 12 is spaced apart from the outer sloping surface 17b of the immediately overlying tray 12, if any. The circular rim 14 of each tray 12 has a series of spaced effluent exit openings 18.

Referring to FIG. 1B, each tray 12 also has an annular-shaped baffle 15a extending inwardly and downwardly from the circular rim 14 with a large, central baffle opening 15b. The baffle 15a is spaced above the respective conical surface 16, but below the level of the effluent exit openings 18, thereby defining an influent circulation space 19 for the respective tray 12 between the inner sloping surface 17a and an outer sloping surface 15c of the baffle 15a. In the illustrated example, the baffle 15a extends downwardly at approximately the same angle as the conical section 16.

Figure 2:
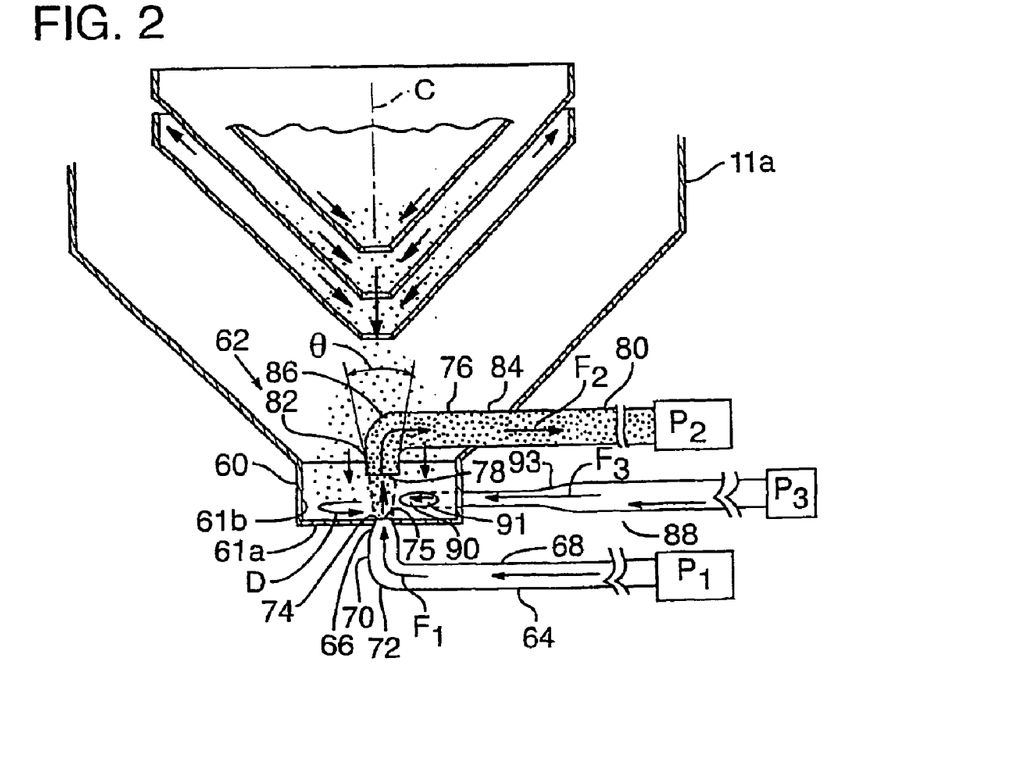
FIG. 2 is a side sectional view of a portion of the right side head cell apparatus of FIG. 1A showing the new underflow collection and evacuation apparatus (or "collector") in place below the head cell apparatus.

When multiple trays 12 are stacked together in alignment with each other as shown, the baffle openings 15b and the grit exit openings 20 of the trays 12 are vertically aligned, as best seen in FIG. 1B. The grit storage chamber 60 is positioned below and in alignment with the grit exit openings 20. As shown in FIGS. 1A and 1B, a pipe 13 can be connected between the grit exit opening 20 in the bottom tray 12 and the grit storage chamber 60 to ensure that separated grit passing through the grit exit openings 20 is collected in the grit storage chamber 60. Alternatively, the system can be configured without the pipe 13 or any other structure to connect the bottom tray 12 and the chamber 60 (e.g., as shown in FIG. 2), in which case the grit collects in the chamber 60 under the action of gravity.

Figure 1C:
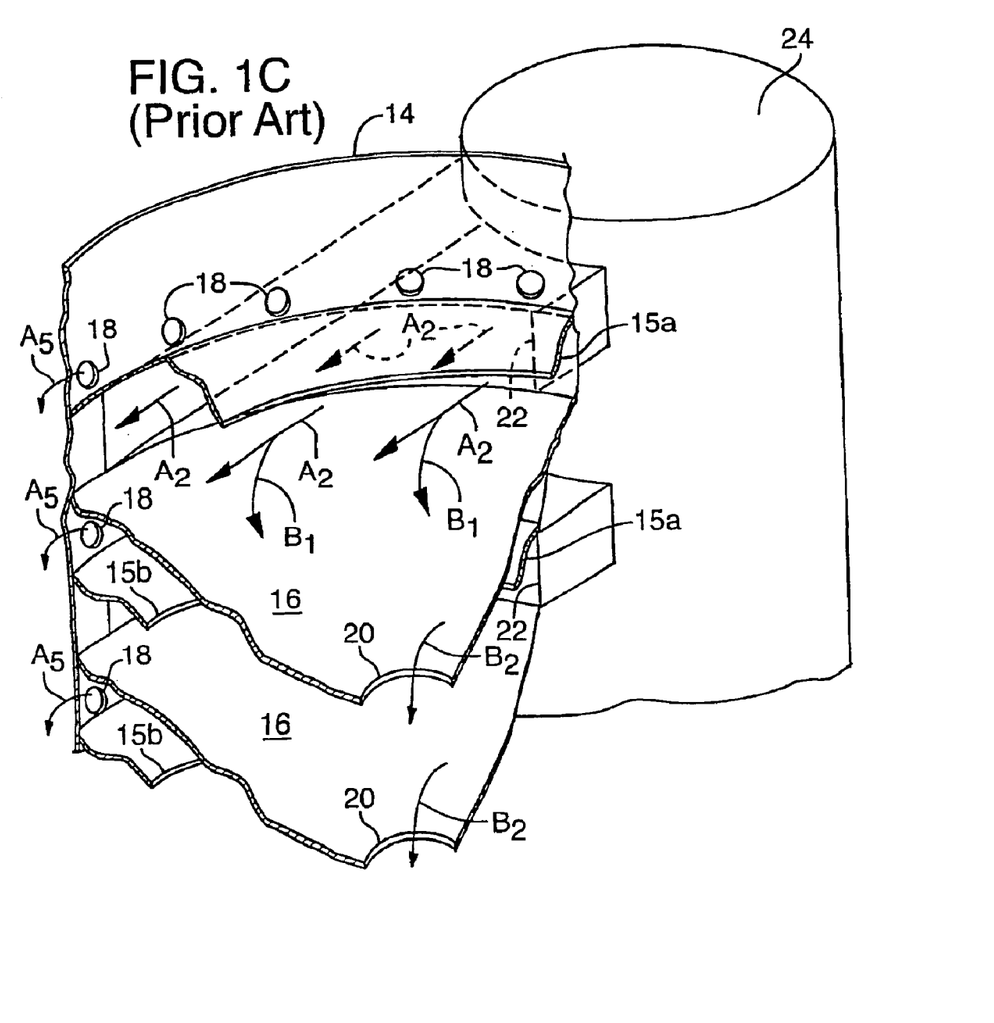
FIG. 1C is a partial perspective sectional view taken from the region 1C in FIG. 1B showing portions of the top three trays and the paths of the influent entering through influent openings into the trays and the effluent and grit exiting the trays.

Referring to FIGS. 1B and 1C, each of the trays 12 also has a peripheral influent entry opening 22 formed in the circular rim 14. As shown for the top tray 12 in FIG. 1B, which has a portion of the baffle 15a removed for clarity, the influent opening 22 is approximately rectangular in cross-section. The influent opening 22 is positioned in the rim 14 between the baffle 15a and the conical section 16 (i.e., within the influent circulation space 19 for the respective tray 12). Two such influent openings 22 are shown in FIG. 1C for the top two trays 12.

Each tray 12 receives a portion of the influent flow travelling upward through the vertical influent pipe 24 via the respective influent entry opening 22. As shown in FIG. 1A, the vertical influent pipe 24 has an inlet 25a that receives influent to be treated, e.g., by a connection to a pipe (not shown) located at a level below the lowest tray 12.

Head Cell Operation

In operation, the head cell apparatus 11a is submerged within a surrounding chamber 21a defined by a vessel wall 21b (FIG. 1B) such that an upper surface 21c of head cell effluent in the chamber 21a is above the level of the top tray 12.

Referring to FIG. 1A, the influent, which is a slurry with a uniform distribution of grit, is directed vertically upward through the inlet 25a and the vertical influent pipe 24 (arrow A1 in FIG. 1A). As the influent flows upwardly, portions of it are successively distributed through the influent openings 22 to each of the respective trays 12.

The influent enters each of the trays 12 in a generally tangential direction (arrow A2 for the top tray 12), and begins to follows the inner periphery of the circular rim 14 within the influent circulation space 19 beneath the baffle 15a. This flow, which is referred to as a primary flow, establishes a circular path (dashed arrows A3 and A4).

As the primary flow circulates around the conical surface 16, a dynamic boundary layer is established at its inner extent in a circular pattern surrounding the center of the conical section 16. This boundary layer induces a secondary flow leading toward the grit exit opening 20. Heavier grit particles become subject to the secondary flow upon entry into the tray 12, and are led by this flow through the grit exit opening 20. Lighter grit particles begin to circulate around the influent circulation space with the primary flow, but, due to gravity, eventually settle onto the conical surface and become subject to the secondary flow.

As the influent flows in this manner, grit is separated out from the influent and onto the inner surface 17a of the conical section 16 of each of the trays 12 (arrow B1). Referring to FIG. 1B, the separated grit travels downwardly through the grit exit opening 20 of the respective tray, any underlying trays (arrows B2) and the pipe 13 (if present), and is collected in a grit collection chamber 60 at the bottom of the head cell 11a.

Meanwhile, the circulating influent, from which grit has been removed, is discharged from each of the trays 12 as effluent. The effluent is discharged through the respective effluent exit openings 18. After circulating partway around the tray 12, the effluent flows upward from the influent circulation space 19, through the respective baffle opening 15b and over the baffle 15a, before exiting through the effluent exit openings 18 (see arrows for the top tray in FIG. 1B).

This upward flow is the result of the primary flow in the circular direction and the secondary flow in the downward direction. In other words, because the influent flow entering the head cell 10 (through the influent openings 22 in the trays 12) is greater than the downward grit flow exiting the head cell 10 (through the openings 20), the effluent flow follows an upward path until it is discharged from the head cell through the openings 18.

After the effluent is discharged, it is then directed elsewhere for subsequent treatment or collection, as desired. In a typical head cell, the energy requirement or head loss due to its operation is about 6 in.

Grit Collection and Transfer

According to the new methods and associated apparatus, grit settles in an area below the separation apparatus, e.g., in a chamber, well or other structure usually having at least bottom and side walls (such as the chamber 60 with its respective bottom wall 61a and side wall 61b), and is transferred out of this area for disposal or other use. The collected grit is transferred (1) by applying an upwardly directed first flow from a point below the grit (e.g., at the bottom wall 61a of the chamber 60) and (2) by applying an upwardly directed second flow to the grit at a point spaced above the first flow. Thus, the first and second flows act on the grit in substantially the same direction.

Figure 4:
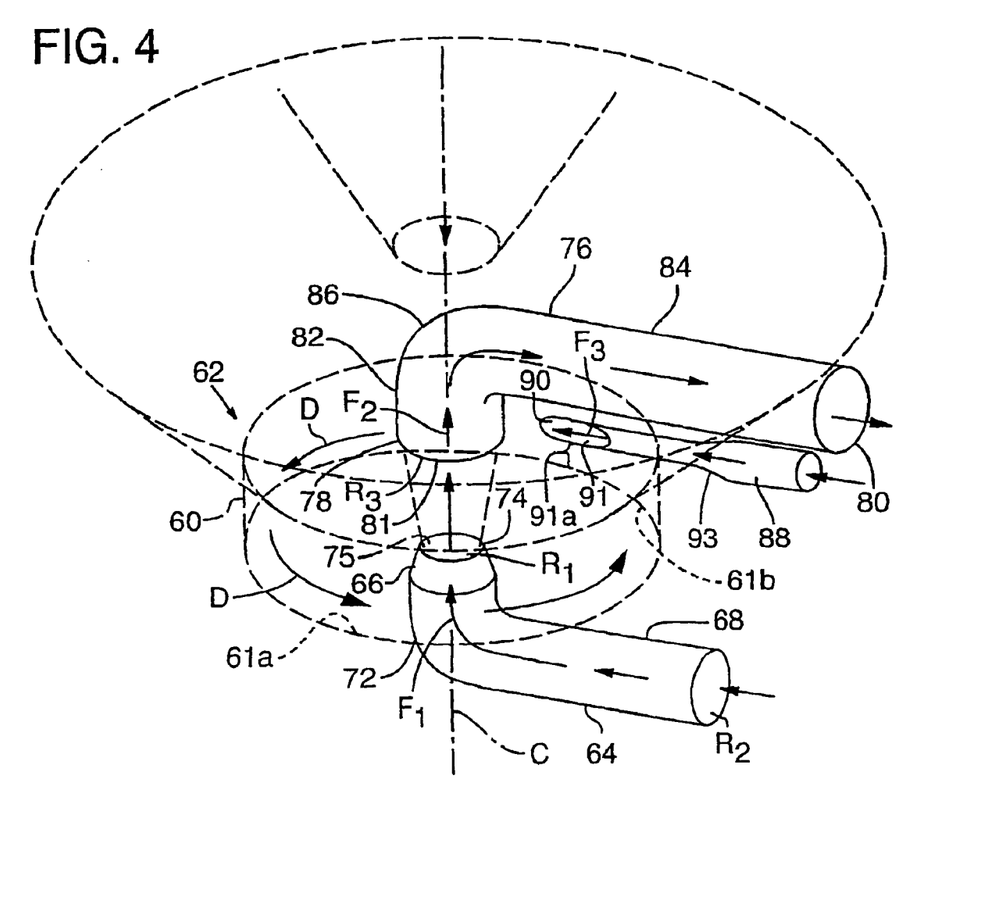
FIG. 4 is a perspective view of the new underflow collector, with the bottommost tray of the head cell and the chamber shown in dashed lines.

The first and second flows may be applied to each act in a substantially vertical direction. Also, the first and second flows may be applied to act along a common axis, and this axis may be a central axis of the separation apparatus. For example, as shown in FIGS. 2 and 4, the flows act along an axis that passes through the center of the aligned grit exit openings 20 in the trays 12

It is also desirable to cause the settling grit and treated influent to circulate within the collection and transfer area during the process. According to one approach, a third flow is applied in a direction that is angled with respect to the line of action of the first and second flows. The third flow is applied to the treated influent and settling grit at a point spaced from the line of action of the first and second flows. Greater circulation occurs if the third flow is applied in a direction substantially perpendicular to the line of action of the first and second flows. Therefore, if the first and second flows are applied in a substantially vertical direction, applying the third flow in a substantially horizontal direction will achieve greater circulation.

If the treated influent and settling grit are contained in a chamber or tank (such as, e.g., the chamber 60), the third flow can be applied in a direction tangential to the wall of the chamber or tank. In this way, the third flow generates circulation in the chamber or tank. Greater circulation occurs if the chamber or tank has a generally circular periphery, thus maximizing the effect of the third flow. Circulation within the chamber generates a boundary layer that causes grit to move toward the center of the chamber in a sweeping action, rather than settling (e.g., on the bottom wall 61a).

The first and second flows may be applied to the accumulated grit hydraulically, and without the need for positioning moving mechanical assemblies (e.g., a paddle, blade, piston or propeller) within the chamber 60. Such mechanical assemblies can seize or otherwise become inoperable due to the abrasive nature of grit, or in the event of grit accumulation in the chamber 60. Grit can "bridge" between parts of these assemblies that are intended to move and nearby stationary objects, including the interior walls 61a, 61b of the chamber 60.

In the event that a substantial accumulation of grit develops in the chamber 60, e.g., due to a particularly high concentration of grit in the influent being treated or a power failure that causes the transfer operation to cease, the hydraulically applied first and second flows allow the system "to dig itself out." Unlike conventional moving mechanical assemblies, there are no rotating or reciprocating components that can be bonded in place by bridging grit.

The third flow can also be applied hydraulically. A pressurized fluid flow, sometimes referred to as a scour flow, is provided in a direction generally transverse to the first and second upwardly directed flows. The scour flow may be directed inwardly from a direction substantially tangential to the periphery of the chamber 60. The circulation of fluid and grit in the chamber 60 at the desired rate tends to prevent the grit from settling and cause the grit to move inwardly toward the center of the chamber (where it becomes more directly subject to the action of the first and second flows).

Specific Implementations

Figure 3:
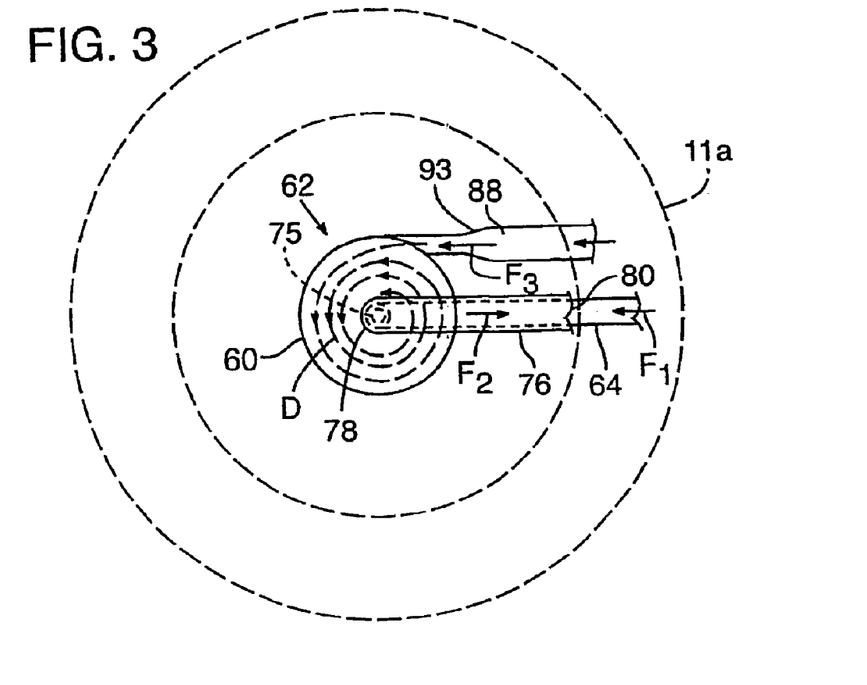
FIG. 3 is a top plan view of the new underflow collector of FIG. 2, with the outline of the head cell apparatus shown in dashed lines.

A specific implementation of an underflow collector 62 is shown in FIGS. 2–4.

As shown in FIG. 2, the collector 62 is positioned generally below the separation apparatus (i.e., the headcell 11a in this example), with a portion being within the interior of the chamber 60.

Referring to FIG. 2, a first passageway 64 extends from a source of higher pressure $P_1$ (e.g., a pump) outside the chamber 60 and terminates at its outlet end in a nozzle 66, which is positioned adjacent the chamber 60. In the specific implementation shown, the first passageway 64 has a first section 68 that extends in a generally horizontal direction, a second section 70 that extends in a generally vertical direction and terminates at the nozzle 66, and a bend 72 where the horizontal and vertical sections 68 and 70 join together, as shown in FIGS. 2 and 4.

In the specific implementation shown, the nozzle 66 has a tip 74 that is vertically positioned in approximate alignment with the adjacent bottom wall 61b of the chamber 60. At the tip 74, a nozzle opening 75 having a cross section $R_1$ (FIG. 4), which is smaller than a cross section $R_2$ of the first section 68, is defined.

In the specific implementation shown, the nozzle 66 is positioned to expel fluid upwardly along a central axis C of the chamber 60, which is also a substantially vertical direction for the illustrated configuration.

A second passageway 76 is spaced from and positioned above the first passageway 64. The second passageway 76 has an inlet end 78 positioned within the chamber 60, and an outlet side 80 extending to a source of lower pressure $P_2$ (e.g., a suction pump) located outside of the chamber 60 (FIG. 2).

The inlet end 78 of the second passageway 76 is above and generally aligned with the first nozzle 66. In the specific implementation shown, the inlet end 78 is aligned with the first nozzle 66 along the central axis C (FIGS. 3 and 4).

The inlet end 78 defines an inlet opening 81. The inlet opening 81 has a cross section $R_3$ (FIG. 4) that is sized at least as large as the cross section $R_1$ of the nozzle opening 75. In the illustrated implementation, the inlet opening 81 is at least 200% larger than the nozzle opening 75. Specific details regarding the size and position of the inlet opening 81 are described in detail below.

In the illustrated implementation, the second passageway 76 has a generally vertical first section 82 leading from the inlet end 78, a generally horizontal second section 84 leading to the outlet end 80, and a bend 86 where the first and second sections 82 and 84 join together. A portion of the second passageway 76 may be suspended within or above the chamber 60, as in the case of the illustrated implementation in which the second section 84 extends through the side wall of the head cell 11a.

The collector 62 also has a third passageway 88 extending from a source of higher pressure $P_3$ located outside the chamber 60 to an outlet end 90 at the side wall 61b of the chamber 60.

The third passageway 88, which extends in a generally horizontal direction, has a nozzle 93 that allows a pressurized flow of fluid to be ejected from the outlet end 90. The third passageway 88 is positioned to intersect the chamber 60 substantially at a tangent to the side wall 61b.

The outlet end 90 defines an outlet opening 91. In the specific implementation as best shown in FIG. 4, a lower side 91a of the opening 91 is positioned above the level of the bottom wall 61a of the chamber 60. Positioning the opening 91 above the bottom wall 61a, e.g., at a level about one diameter of the outlet opening 91 higher, may help prevent the third flow $F_3$ from disturbing the sweeping action (toward the center of the chamber) established by the boundary layer.

Operation

In operation, referring to FIGS. 2 and 4, pressure is applied to a fluid, e.g., plant water, in the, first passage 64 to cause the fluid to be expelled upwardly into the chamber 60 through the nozzle 66. In this way, the fluid exerts the first flow, i.e., an upward flow $F_1$ from below, on the treated influent and grit in the chamber 60. By urging grit upwardly from the bottom wall 61a of the chamber, the first flow $F_1$ tends to counteract the grit's tendency to settle onto and become bonded to the bottom wall 61a.

The second flow is generated by applying suction pressure to the second passageway 76. Thus, a second upward flow $F_2$ is exerted on the treated influent and grit in the chamber 60 at a point just below the inlet opening 81 of the second passageway 76. In the illustrated implementation, the second flow $F_2$ is coaxial with the first flow $F_1$, and thus the two flows act together in urging the grit upward into the second passageway 76 for transfer out of the chamber 60. The grit is "pushed upward" from the bottom by the first flow $F_1$ and "pulled upward" from the top by the second flow $F_2$.

The third flow can be generated by supplying a pressurized stream of fluid (e.g., plant water) through the third passageway 88 and into the chamber 60. The third flow enters the chamber 60 through the opening 91 at the side wall 61b from a direction approximately tangential to the side wall 61b. The third flow generates a circulation of the wastewater and grit in the chamber 60 as shown by the arrows D.

In a specific implementation, the magnitude of the second flow is at least as great as the sum of the magnitudes of the first and third flows.

Referring to FIG. 2, the jet flow exiting the first nozzle 66 forms a truncated cone extending upward from the first nozzle opening 75, and expanding from the diameter of the opening 75 to a larger diameter. For the sake of illustration, the angle θ, which is about 14° in the illustrated embodiment, shows the rate by which the upward end of the cone expands as the distance from the tip 74 increases.

Figure 6A:
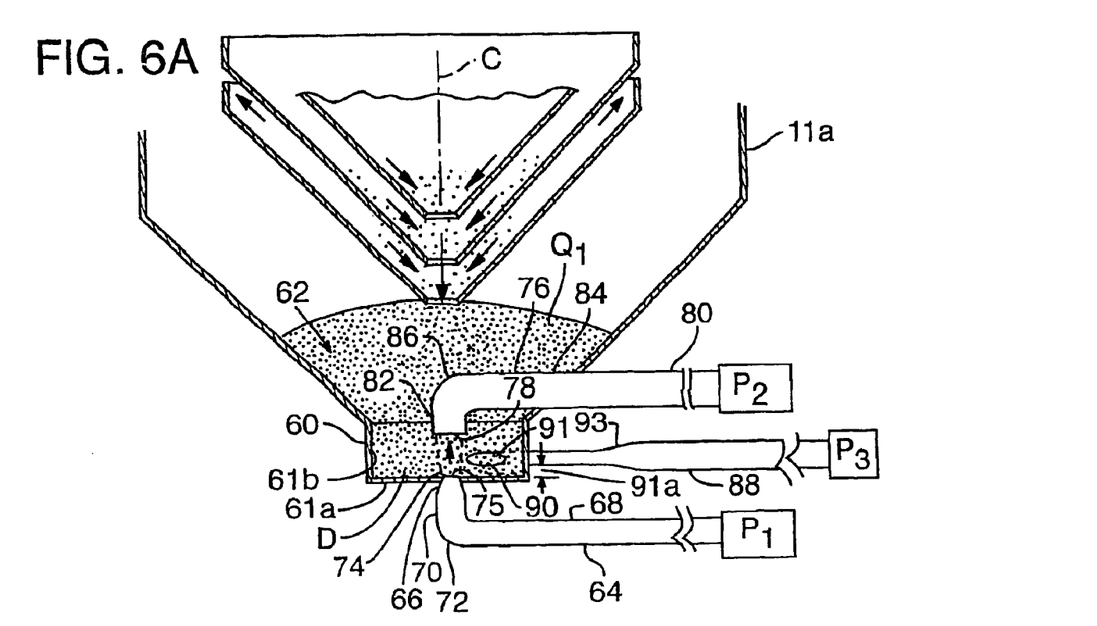
FIGS. 6A, 6B and 6C are additional side sectional views similar to FIG. 2 showing the appearance of an accumulation of grit due to a heavy grit load initially, after the collector begins to recover such that the rate of grit transfer exceeds the grit settling rate, and when the accumulation has nearly all been transferred out of the chamber.
Figure 6B:
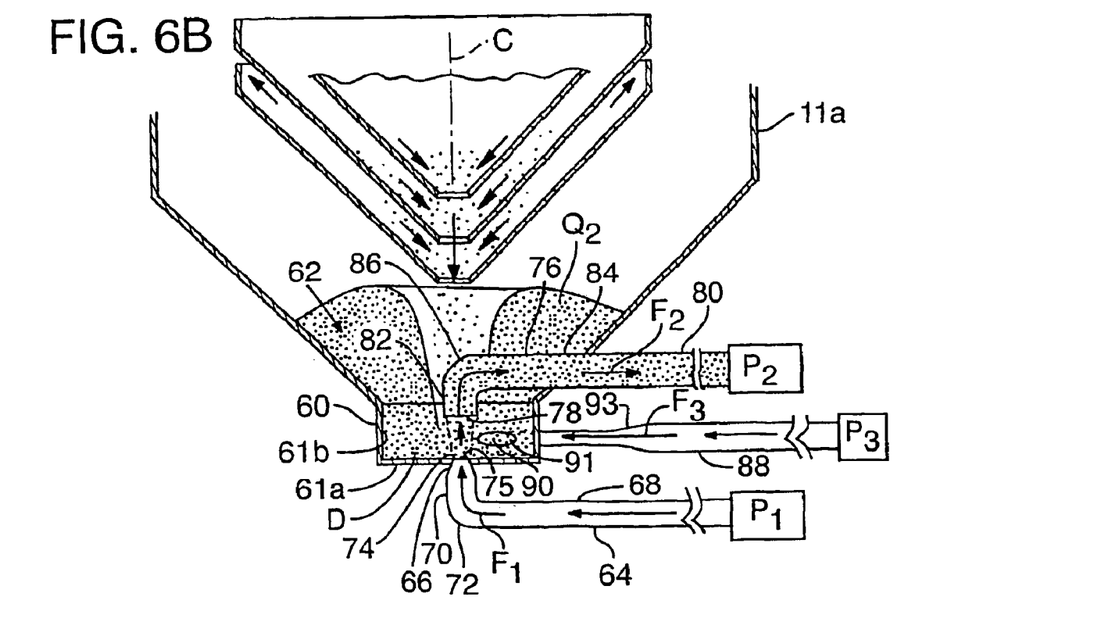
Figure 6C:
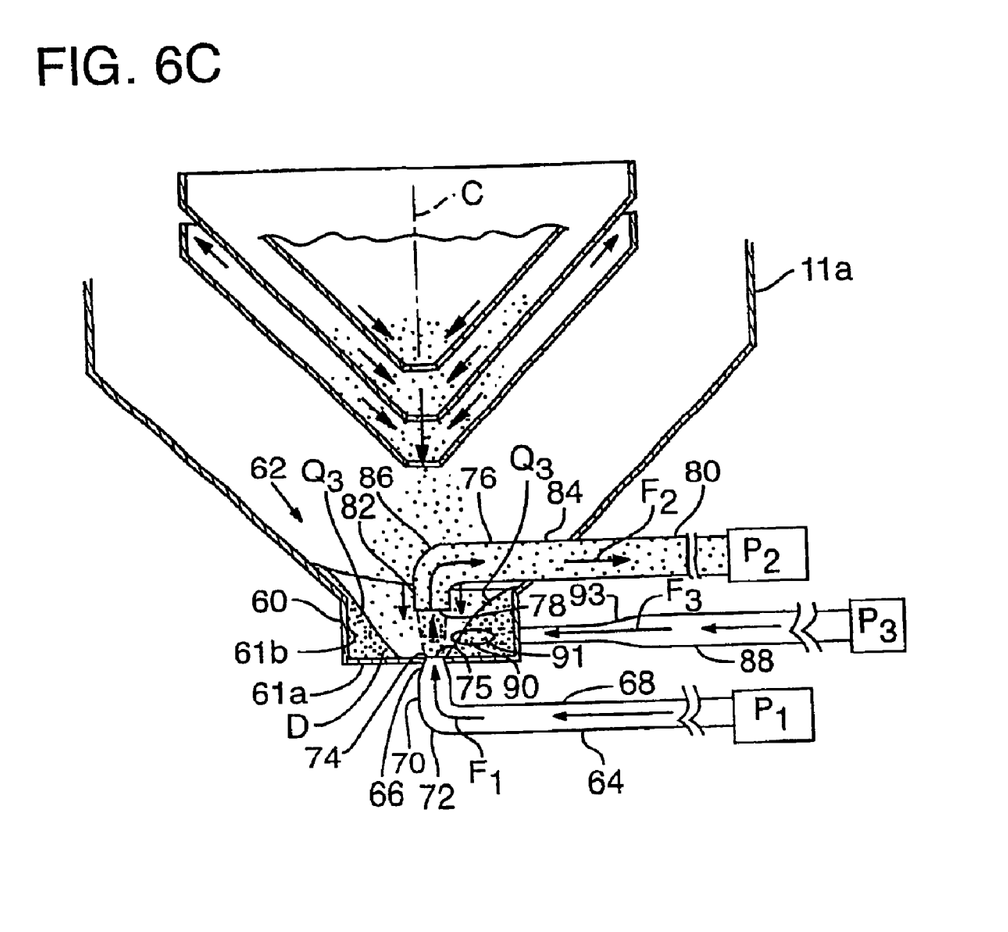

FIGS. 6A–6C show how the collector operates when the chamber 60 becomes filled with bridged grit, which may occur when the power supply to collector is interrupted. Under grit loads within typical design parameters, the collector functions continuously to transfer grit (as well as the treated influent that carries it) at a rate greater than or equal to the grit settling rate from the head cell (i.e., the rate at which grit accumulates in the area below the head cell).

In FIG. 6A, the collector 62 has become filled with bridged grit because the first, second and third flows ceased following an interruption in the power supply. The extent of the grit load $Q_1$ fills the chamber 60 and is above the respective levels of the nozzle opening 75, the inlet end 78 and the opening 91. As shown, the grit load $Q_1$ also extends upward along the slanted sides of the head cell 11a.

Despite the grit load $Q_1$, the collector 61 can be returned to operation, as shown in FIG. 6B. Eventually, the grit transfer rate begins to exceed the grit loading rate and eventually compensates by beginning to reduce the accumulation. Continued exertion of the first and second upward flows (at the nozzle opening 75 and the inlet end 78, respectively) begins to influence and move grit in an approximately conical region extending from its tip at the nozzle opening 75 to its base at the tip of the grit load $Q_1$. This grit is transferred out of the chamber 60 through the second passageway 76 in the manner described above. As operation continues, grit from the sides of the conical region near the top begins to be moved, thus giving the grit load $Q_2$ in FIG. 6B the appearance of a "rat hole."

With continued operation and without substantial additional grit, the collector 62 will continue transferring the grit load, working radially outwardly from the inside of the conical region. In FIG. 6C, continued operation of the collector has transferred a substantial portion of the grit load, the remaining grit load being shown at $Q_3$.

Apparatus and Operating Parameters

The size and position of the inlet end 78 of the second passageway 76 is determined such that the inlet opening 81 is at least as large as the cone extending upward from the nozzle 66. In the illustrated implementation, the inlet opening 81 is spaced from the first nozzle 66 by a distance of about twice the nozzle opening 75 diameter, and is sized to be at least twice the nozzle opening 75 diameter. If the inlet opening 81 is positioned closer to the nozzle opening, its diameter 81 can be smaller. Correspondingly, if the inlet opening 81 is positioned farther from the nozzle opening 75, the inlet opening should be larger to achieve optimum performance.

The sources of pressure $P_1$, $P_2$ and $P_3$ are shown as discrete sources in FIG. 2, but any two or more of the sources $P_1$, $P_2$ and $P_3$ may be implemented as a single source. In other words, a single pump may be configured with its high pressure side as the sources $P_1$ and/or $P_3$, and the same pump could also be configured with its low pressure side as the source $P_2$. One example of a suitable pump for the suction flow $F_2$ is a vortex-type pump with a recessed impeller capable of handling grit slurry.

Regarding the nozzles 66 and 93, any suitable construction that coverts a high pressure, low velocity flow into a high pressure flow with minimal head loss can be used. Typical nozzles are formed in a shape of a cone extending in the downstream direction with an included angle of about 60° to about 90°. Structures other than nozzles that produce the same effects can also be used.

Having illustrated and described the principles of my invention with reference to several preferred embodiments, it should be apparent to those of ordinary skill in the art that the invention may be modified in arrangement and detail without departing from such principles.

What is claimed is:

1. A method of transferring settling solids that are undergoing separation from raw surface water or wastewater, comprising:
    collecting settling solids in an area having at least a bottom surface and a surrounding side surface;
    applying a first jet flow with a nozzle to the collecting solids in an upward direction from a point adjacent the bottom surface; and
    applying a second flow to the collecting solids, the second flow being a suction flow applied in the upward direction at a point above the first flow through a passageway leading out of the area;
    whereby the first and second flows urge settling grit upward and out of the area through the passageway.

2. The method of claim 1, wherein the act of exerting a first flow includes channeling a fluid out through the nozzle at a point approximately centered within the bottom surface of the area.

3. The method of claim 1, further comprising applying a third flow in a direction angled with respect to the first flow from a point adjacent the surrounding side surface of the area.

4. The method of claim 3, wherein the direction of the third flow is perpendicular to the first flow.

5. The method of claim 3, wherein the act of applying a third flow includes channeling a fluid out through a passageway having an outlet end positioned adjacent the side surface.

6. The method of claim 3, wherein the third flow causes the settling grit and treated influent to circulate within the area.

7. The method of claim 1, further comprising circulating the settling grit and treated influent within the area.

8. The method of claim 3, wherein the first and third flows are applied with a common source of positive pressure.

9. An apparatus for collecting and transferring grit that is being separated from raw surface water or wastewater, comprising:
    a first passageway terminating in an outlet end with a jet-producing nozzle positioned to direct a jet flow of pressurized fluid within the passageway upward through a bottom surface of an area where the grit is being collected; and
    a second passageway having an inlet end spaced above the outlet end of the first passageway, the second passageway being connected to a source of suction pressure to exert an upward flow at the outlet end and to receive grit and treated influent.

10. The apparatus of claim 9, further comprising a third passageway that leads to an area where grit can be collected, the third passageway extending in a direction that is angled with respect to and spaced from the upward direction of the nozzle.

11. The apparatus of claim 9, wherein the area comprises a chamber having at least a bottom surface at which the nozzle is positioned and a surrounding side surface.

12. The apparatus of claim 11, wherein a portion of the second passageway is suspended above the bottom surface of the chamber.

13. The apparatus of claim 11, wherein the surrounding side surface of the chamber is generally cylindrical.

14. The apparatus of claim 11, wherein the chamber has a central axis and the nozzle is positioned to direct the flow into the chamber generally along the central axis.

15. The apparatus of claim 14, wherein the inlet end of the second passageway is aligned on the central axis above the nozzle.

16. The apparatus of claim 11, further comprising a third passageway leading to the surrounding side surface of the chamber and defining an outlet opening to the chamber.

17. The apparatus of claim 9, wherein the outlet end of the first passageway has an opening with a major dimension, and the inlet end of the second passageway is positioned above the outlet end of the first passageway by a distance of at least about two times the major dimension.

18. The apparatus of claim 9, wherein a diameter of the inlet end of the second passageway is at least about two times greater than a diameter of the outlet end of the first passageway.

19. An apparatus for separating grit from raw surface water or wastewater and transferring the separated grit, comprising:

a separation apparatus into which influent containing grit is fed and at least a portion of the grit is separated, the resulting effluent being channeled away from the separation apparatus; and a grit collection and transfer apparatus positioned at a level below the separation apparatus and to receive the separated grit, the grit collection and transfer apparatus having a bottom surface, a surrounding side surface and a nozzle positioned adjacent the bottom surface through which a first jet flow of pressurized fluid is applied against the separated grit and a passageway spaced above and aligned with the nozzle through which a second, suction flow is applied in a generally common direction as the first flow to draw treated influent and grit into the passageway for transfer from the apparatus.

* * * * *